United States Patent [19]
Ma et al.

[11] Patent Number: 5,741,382
[45] Date of Patent: Apr. 21, 1998

[54] METHOD FOR PREPARING ORIENTED DISCONTINUOUS LONG FIBER REINFORCED THERMOPLASTIC RESIN COMPOSITE SHEET PRODUCT

[75] Inventors: Chen-Chi Martin Ma; Shih-Hsiung Lin, both of Hsinchu, Taiwan

[73] Assignee: National Science Council, Taipei, Taiwan

[21] Appl. No.: 643,943

[22] Filed: May 7, 1996

[51] Int. Cl.$^6$ .................................................. B32B 31/16
[52] U.S. Cl. ..................... 156/73.6; 156/276; 264/109
[58] Field of Search ............................ 156/62.2, 73.6, 156/276, 296, 308.2; 264/69, 108, 109; 209/236, 254, 322, 323, 675, 680, 920, 921

[56] References Cited

U.S. PATENT DOCUMENTS

| | | | |
|---|---|---|---|
| 1,716,758 | 6/1929 | Bland | 209/322 |
| 2,678,081 | 5/1954 | Rainard et al. | 264/109 |
| 3,202,743 | 8/1965 | Elmendorf | 264/109 |
| 3,508,301 | 4/1970 | Brown | 264/109 |
| 5,093,050 | 3/1992 | Tepic . | |
| 5,288,348 | 2/1994 | Modrak | 156/62.2 |

FOREIGN PATENT DOCUMENTS 2026375  2/1980  United Kingdom .

OTHER PUBLICATIONS

L. Kacir and O. Ishai, "Oriented Short Glass–Fiber Composites. I. Preparation and Statistical Analysis of Aligned Fiber Mats," *Polymer Engineering and Science*, Jul., 1975, vol. 15, No. 17, pp. 526–531.

*Primary Examiner*—Richard Crispino
*Attorney, Agent, or Firm*—Hitt Chwang & Gaines, P.C.

[57] ABSTRACT

A method for preparing a thermoplastic resin composite sheet product reinforced by oriented and discontinuous long fibers comprises a first step in which a plurality of prepreg pieces of a fiber-reinforced thermoplastic resin composite are fed to a horizontal sieve plate in vibration. The prepreg pieces are then caused by the vibration of the sieve plate to fall through the parallel ditches of the sieve plate on a mold plate or thermoplastic resin sheet product located under the sieve plate. The prepreg pieces deposited on the mold plate or thermoplastic resin sheet product are subsequently subjected to heating and pressing such that a thermoplastic resin composite sheet product reinforced by the oriented discontinuous long fibers is formed.

16 Claims, 5 Drawing Sheets

METHOD FOR PREPARING ORIENTED DISCONTINUOUS LONG FIBER REINFORCED THERMOPLASTIC RESIN COMPOSITE SHEET PRODUCT

FIELD OF THE INVENTION

The present invention relates generally to a method for preparing a thermoplastic resin composite material, and more particularly to a method for preparing a thermoplastic resin composite sheet product which is reinforced by the oriented and discontinuous long fibers with various fiber length.

BACKGROUND OF THE INVENTION

According to the prior art technology, the fiber-reinforced resin pellets are made of short fibers having a length ranging between 3 and 6 mm, and thermoplastic resin powder or granules, which are processed in an extruder. A variety of articles are made of the fiber-reinforced resin pellets by injection molding. In the processes described above, the short fibers are caused to break to have a length ranging between 0.2 and 0.4 mm. In addition, the reinforcing effect of the short 0.2-0.4 mm fibers is undermined by the disorientation thereof. Therefore, the mechanical properties of the end products made of the prior art fiber-reinforced resin pellets is compromised in view of the fact that the end products are reinforced by disoriented short fibers even though they can be molded or shaped easily.

In 1975, L. Kacir, et al disclosed a method for improving the orientation of short fibers of a mat. The method was published in POLYMER ENGINEERING AND SCIENCE, Vol. 15, No. 7 (1975), pp. 525-531. However, the method is not effective in upgrading the mechanical property of the mat in view of the fact that the short fibers have a length ranging only between 3 and 12 mm even though up to 90% of the short fibers are arranged within ±15° from the longitudinal axis of the mat.

One of these inventors of the present invention, Mr. Chen-Chi Martin Ma, and his coworker disclose in the Taiwanese Patent Nos. 44724 and 57397 fiber-reinforced plastic pellets containing fibers having a length up to 12.4 mm. Such fiber-reinforced plastic pellets as referred to above is suitable for use in making various articles by injection molding. The fiber-reinforced plastic pellets can be molded or shaped easily; nevertheless the fibers contained in the pellets are vulnerable to break in the course of injection molding. As a result, the articles made of such plastic pellets contain fibers having a length ranging only between 0.4 and 1.0 min. Accordingly, the articles so made are generally poor in mechanical property as compared with the articles made of the continuous fiber reinforced thermoplastic resin composite material.

The articles made of continuous fiber reinforced thermoplastic resin composite material have a relatively higher stiffness and strength. However, the thermoplastic resin composite material reinforced by the continuous fibers can not be formed or shaped easily in view of the fact that it lacks flexibility. For this reason, the continuous fiber reinforced thermoplastic resin composite material as described above is not suitable for use in making an article which has recesses or a complicated configuration. In other words, the article made of the continuous fiber reinforced thermoplastic resin composite material is susceptible to being wrinkled or distorted.

In 1987, R. K. Okine, who was a researcher at the DuPont Corporation of the United States, introduced a method for making a thin platelike thermoplastic resin composite material which is reinforced by long discontinuous fibers (called LDF in abbreviation). The method was disclosed in the 32nd INTERNATIONAL SAMPE SYMPOSIUM, pp. 1413-1425. The LDF-reinforced thermoplastic resin composite material contains fibers having a length ranging between 2.54 and 15.24 cm. The fibers are arranged regularly such that 85% or more of fibers are within the deviation of the longitudinal angle ±5°. As a result, the LDF-reinforced thermoplastic resin composite material is similar in characteristics to be the continuous fibers reinforced thermoplastic resin composite material. Moreover, the LDF-reinforced thermoplastic resin composite material can be formed and shaped more easily than the continuous fibers reinforced thermoplastic resin composite material, as suggested by James F. Pratte, et al. in the 34th INTERNATIONAL SAMPE SYMPOSIUM (1989), pp. 2229-2242; Steven J. Medwin in the 33rd INTERNATIONAL SAMPE SYMPOSIUM (1988), pp. 317-323; and R. K. Okine, et al. in JOURNAL OF REINFORCED PLASTICS AND COMPOSITES, Vol. 8, pp. 70-90 (1990). So far, the DuPont Corporation of the United States has never disclosed publicly a method for making the LDF-reinforced thermoplastic resin composite material. In addition, there is no public disclosure of any other prior art method for making the LDF-reinforced thermoplastic resin composite sheet product.

SUMMARY OF THE INVENTION

It is therefore the primary objective of the present invention to provide a method for preparing a thermoplastic resin composite sheet product reinforced by the oriented and discontinuous long fibers having a fiber length ranging between 1 cm and 20 cm. The sheet product is preferably composed of more than 85% of the long fibers which are oriented such that their deviation angle from the longitudinal axis is within ±5°.

In keeping with the principle of the present invention, the foregoing objective of the present invention is attained by the method for preparing a thermoplastic resin composite sheet product which is reinforced by the oriented and discontinuous long fibers. The method comprises several steps, which are explicitly expounded in sequence hereinafter.

The first step of the method of the present invention involves introducing a plurality of small rectangular striplike prepreg pieces of a fiber-reinforced thermoplastic resin composite to a horizontal sieve plate in vibration. The prepreg pieces have a length ranging between 1 and 20 cm, a width ranging between 0.01 and 0.2 cm, and a thickness ranging between 0.01 and 0.2 cm. The horizontal sieve plate has a plurality of the oriented ditches parallel to one another. The ditches have a length greater than the length of the prepreg pieces, and a width greater than the width and the thickness of the prepreg pieces. The ditches have a width ranging between 1 and 5 mm.

A molding plate or thermoplastic resin sheet product is placed under the sieve plate in motion before or at the time when the prepreg pieces are introduced to the sieve plate. The prepreg pieces are caused by the vibration of the sieve plate to fall on the molding plate or the thermoplastic resin sheet product through the ditches of the sieve plate.

Upon completion of the second step in which the prepreg pieces are deposited on the molding plate or the thermoplastic resin sheet product, the molding plate or thermoplastic resin sheet product is removed horizontally from the underneath of the sieve plate.

Upon being removed from the underneath of the sieve plate, the prepreg pieces were put on the compression molding plate or thermoplastic resin sheet product is subjected to heating and pressing so as to form a thermoplastic resin composite sheet product reinforced by the oriented and discontinuous long fibers.

The prepreg pieces referred to in the method of the present invention described above are preferably formed by cutting a prepreg sheet of a continuous fiber reinforced thermoplastic resin composite which has a thickness ranging between 0.01 cm and 0.2 cm. The prepreg sheet is cut to become the prepreg pieces having a length ranging between 1 cm and 20 cm and having a width ranging between 0.01 cm and 0.2 cm. The continuous fibers used in the prepreg sheet may be in the form of strand, roving, woven roving, cloth, or mat.

Preferably, the thermoplastic resin of the fiber-reinforced thermoplastic resin composite referred to in the method of the present invention is polypropylene (PP), polyamides (nylon), acrylonitrile-butadiene-styrene copolymers (ABS), polycarbonate (PC), or poly(ether ketone ketone) (PEEK).

Preferably, the fiber for use in the fiber-reinforced thermoplastic resin composite of the method of the present invention is glass fiber, carbon fiber, aromatic polyamide fiber, ceramic fiber, metal fiber, or hybrid fiber thereof.

Preferably, the prepreg pieces used in the method of the present invention has a length ranging between 1.0 cm and 10 cm.

Preferably, the ditches of the horizontal sieve plate used in the method of the present invention have a width ranging between 2.5 mm and 5.0 mm.

Preferably, the vibration frequency of the sieve plate used in the present invention ranges between 1 and 50 Hz, more preferably, 10 and 30 Hz.

Preferably, the horizontal sieve plate of the method of the present invention is caused to vibrate substantially up and down in the direction perpendicular to the horizontal level on which the horizontal sieve plate is disposed.

According to an embodiment of the present invention, 95% of the fibers of a thermoplastic resin composite sheet product reinforced by the discontinuous long fibers are oriented such that they are deviated within the angular range of ±5° from the longitudinal axis. The reinforcing fibers have a length of 15 cm. The tensile strength of the sheet product made by the method of the present invention is about 80% of that of the thermoplastic resin composite sheet product reinforced by the continuous fibers. However, the tensile strength of the sheet product of the present invention is much greater than the tensile strengths of the composite materials reinforced by the non-oriented long fibers and short fibers.

The present invention further discloses a method for preparing an oriented discontinuous long fiber reinforced thermoplastic resin composite sheet product. The method comprises several steps, which are expounded explicitly hereinafter.

In the first step of the method of the present invention, a plurality of filaments are deposited on the horizontally disposed sieve plate in vibration. The sieve plate has a plurality of ditches parallel to one another. The ditches have a length greater than the length of the filaments. In addition, the ditches have a width greater than the width and the thickness of the filaments, with the width of the ditches being in the range of 1–5 min.

A bottom layer of thermoplastic resin sheet product is placed under the sieve plate in vibration before or at the time when the filaments are deposited on the sieve plate. The vibration of the sieve plate causes the filaments to fall on the bottom layer of thermoplastic resin sheet product through the ditches.

Thereafter, the bottom layer of thermoplastic resin sheet product is removed horizontally from the underneath of the sieve plate. The bottom layer is now provided with the filaments deposited thereon.

The bottom layer having the filaments deposited thereon is covered with an upper layer of thermoplastic resin sheet product so as to form a laminated product comprising the upper layer, the bottom layer and the filaments therebetween.

The laminated product is then subjected to heating and pressing so as to become an oriented discontinuous long fiber reinforced thermoplastic resin composite sheet product.

Preferably, the filaments referred to above in the method of the present invention have a length ranging between 1.0 and 20 cm, a thickness ranging between 0.01 and 0.2 cm, and a width ranging between 0.01 and 0.2 cm.

Preferably, the upper layer and the bottom layer of thermoplastic resin sheet products referred to above in the method of the present invention are PP, nylon, ABS, PC, or PEEK.

Preferably, the filaments referred to above in the method of the present invention is made of glass, carbon, aromatic polyamides, ceramic, metal or hybrid thereof.

Preferably, the ditches of the sieve plate used in the method of the present invention have a width ranging between 2.5 and 5.0 mm.

Preferably, the vibration frequency of the sieve plate used in the method of the present invention ranges between 1.0 and 50 Hz, more preferably between 10 and 30 Hz.

Preferably, the sieve plate of the method of the present invention is caused to vibrate in the direction perpendicular to the horizontal surface of the sieve plate.

DETAILED DESCRIPTION OF THE EMBODIMENTS

Figure 1:
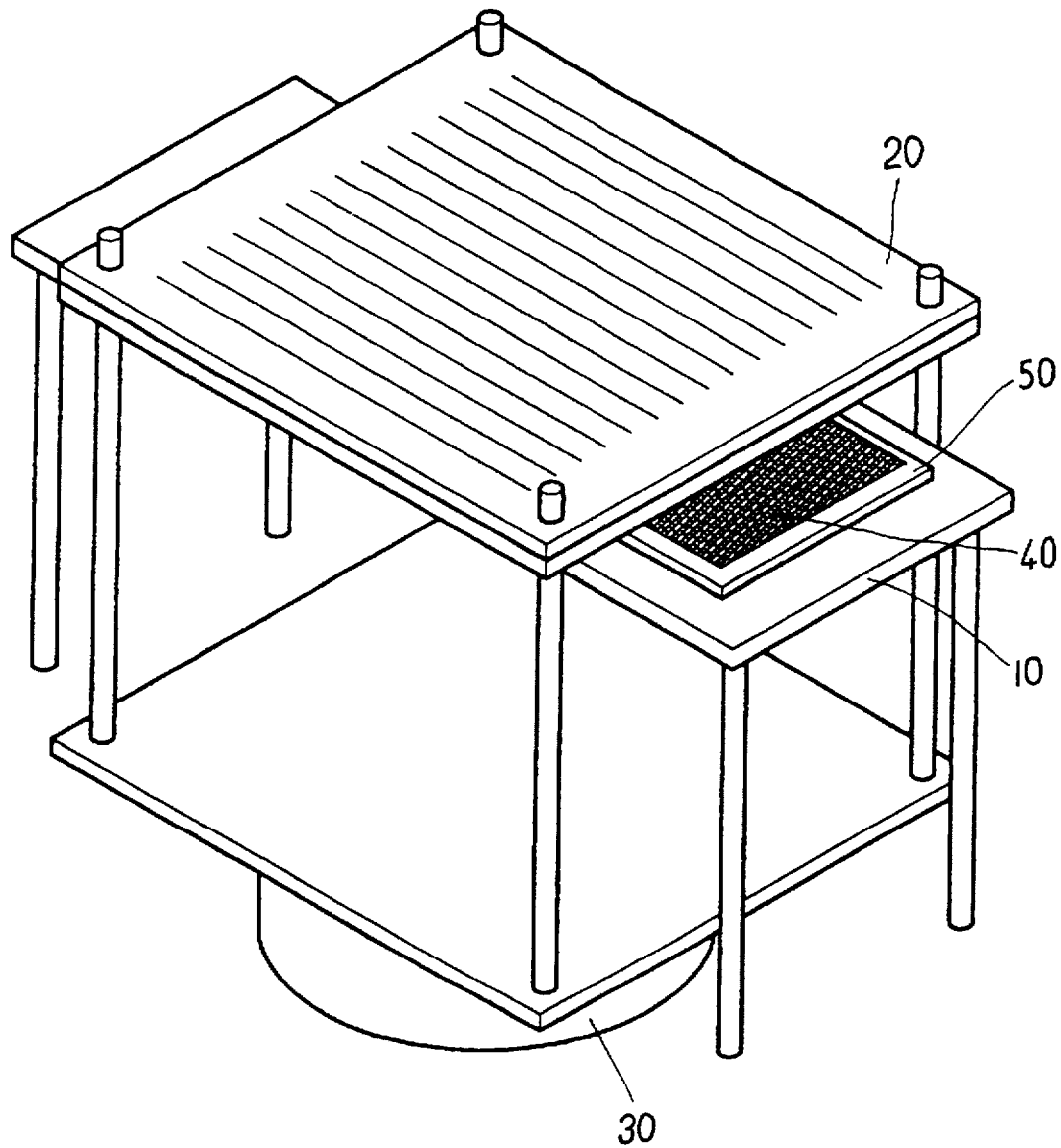
FIG. 1 shows a perspective view of a vibration machine used in the method of the present invention.

A method of the present invention for preparing a thermoplastic resin composite sheet product reinforced by oriented and discontinuous long fibers comprises several steps, which are described explicitly in sequence hereinafter.

The first step of the method of the present invention involves the preparation of a PP prepreg sheet product, a nylon prepreg sheet product, and ABS prepreg sheet product, a PC prepreg sheet product, a PEEK prepreg sheet product, etc., which are reinforced by continuous fibers having a thickness ranging between 0.01 and 0.2 cm, such as glass fibers, carbon fibers, or aromatic polyamide fibers. Any one of the prepreg sheet products referred to above is cut into a number of small rectangular striplike prepreg pieces having a length ranging between 1 and 20 cm and a width ranging between 0.01 and 0.2 cm.

The second step of the method of the present invention involves introducing the striplike prepreg pieces of one or more kinds to a descending semi-elliptical feeding groove. The prepreg pieces are then caused by vibration to fall on a horizontal sieve plate in vibration of a vibration machine. The vibration machine comprises a platform, the horizontal sieve plate located over the platform, and a motor located under the platform such that the motor is connected with the horizontal sieve plate which is provided with a plurality of ditches parallel to one another. The ditches have a length greater than the length of the striplike prepreg pieces. The ditches have a width greater than the width and the thickness of the striplike prepreg pieces. The frequency of the vibration motor ranges between 1 and 50 Hz.

In the third step of the method of the present invention, a molding plate or a thermoplastic resin sheet product is arranged under the horizontal sieve plate in vibration and on the platform of the vibration machine before or at the time when the striplike prepreg pieces are fed. The striplike prepreg pieces are then caused by the vibration to fall on the molding plate or the thermoplastic resin sheet product through the ditches.

Thereafter, the molding plate or the thermoplastic resin sheet product, on which the striplike prepreg pieces are deposited, is removed horizontally from the platform, and is subsequently subjected to heating and pressing under pressure so as to form a oriented discontinuous long fiber reinforced thermoplastic resin composite sheet product.

The tensile strength of the fiber-reinforced thermoplastic resin composite material is dependent on the length and the orientation of the reinforcing fibers. The length of the reinforcing fibers may vary in accordance with the need. It is possible to make a thermoplastic resin composite material which is reinforced by fibers of various lengths.

The striplike prepreg pieces used in the method of the present invention may be replaced with the long fiber reinforced plastic pellets disclosed respectively in the Taiwanese Patent Nos. 44724 and 57397.

In addition, the striplike prepreg pieces used in the method of the present invention may be also replaced with the filaments. For example, in the conventional method for making a sheet molding compound (SMC), a continuous filament is cut by a shearing machine into a plurality of shorter filaments which are then fed into the horizontal sieve plate of the vibration machine that is used in the method of the present invention. The shorter filaments are caused to fall on a bottom layer resin sheet through the ditches of the horizontal sieve plate. The bottom layer resin sheet, on which the shorter filaments are deposited, is then covered with an upper layer resin sheet before it is subjected to heating and pressing under pressure so as to form the sheet molding compound having the oriented fibers.

As illustrated in FIG. 1 a vibration machine used in a first embodiment of the present invention is composed of a platform 10, a horizontal sieve plate 20, and a vibration motor 30. The sieve plate 20 is located over the platform 10 such that there is a gap of 3 mm between the sieve plate 20 and the platform 10. The vibration motor 30 is located under the platform 10 such that the vibration motor 30 is linked with the sieve plate 20. The sieve plate 20 has a length of 30 cm and a width of 30 cm. In addition, the sieve plate 20 is provided with a plurality of elongated ditches having a width of 2.5 mm. The elongated ditches are arranged such that two adjoining ditches are separated by an interval of 3 mm.

The first embodiment of the present invention involves a process of orienting the fibers. In the process, a continuous nylon 12/glass fiber tape produced by the Baycomp Corporation of Canada was used. The tape bears the product code of ATGA-300-05265 and contains 65% by weight of fibers. The tape has a thickness of 0.5 mm and a width of 30 mm. The tape was cut by shearing into a plurality of rectangular thin sheets having a length of 5 cm and a width smaller than 1 mm.

Each time 50 pieces of the rectangular thin sheets were deposited evenly on the horizontal sieve plate 20 of the vibration machine. As the motor 30 was started, the sieve plate 20 was caused to vibrate at the vibration frequency of 10 Hz. As a result, over 90% of the rectangular thin sheets were caused by the vibration of the sieve plate 20 to fall on the platform 10 in 60 seconds. The state of the orientation of the thin sheets on the platform 10 was recorded with a camera. The process described above was repeated 10 times so as to result in 10 orientation pictures. The images of the orientation pictures were transmitted to a computer display. With the application of the Japanese "OPTIMAS" image analysis software, the state of the orientation of 500 thin sheets was calculated, as shown in Table 1. The fiber orientation of the first preferred embodiment of the present invention was deemed good in view of the fact that over 90% of the rectangular thin sheets were found to be oriented in the angular range of ±10° of a longitudinal axis.

Figure 1A:
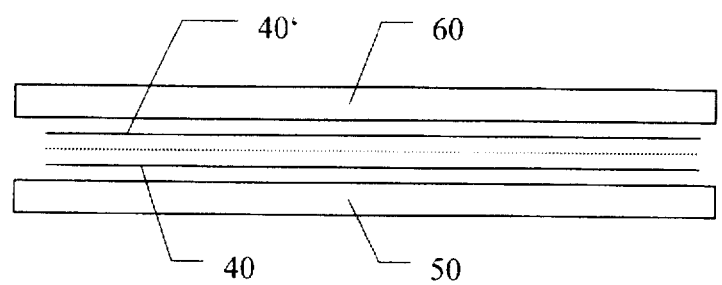
FIG. 1a shows a cross sectional view of an upper and a lower molds used in the method of the present invention, between which a plurality of oriented prepreg pieces are sandwiched.

For preparing a thermoplastic resin composite material reinforced by the discontinuous long fibers, a lower mold 50 was disposed on the platform 10. The lower mold 50 was covered with a release film 40 made by Airtech Corporation, U.S.A. Thereafter, 50 g of the above-mentioned rectangular thin pieces were oriented on the release film 40 before the release film 40 and the lower mold 50 were taken out horizontally from the vibration machine. An upper mold 60 was provided with a release film 40' which was attached to the underside of the upper mold 60. The upper mold 60 and the lower mold 50 were joined together such that the rectangular thin sheets were sandwiched between two release films 40 and 40', as illustrated in FIG. 1a, so as to form a laminated product. The laminated product was wrapped in a vacuum bag made by the Airtech Corporation, U.S.A., before the laminated product was subjected to a heating and pressing process under pressure. The heating process was carried out by a 180° C. pre-heating for 15 minutes. The pressure was increased to 500 psi (3.45 MPa) for another 15 minutes before the molds 50 and 60, along with the laminated product, were taken out to be cooled by a cold die for 5 minutes. The laminated product was then removed from the molds 50 and 60 before it was rolled over between a pair of rollers under heat and pressure. Upon completion of the heating and pressing, cooling, and rolling processes for one more time, a oriented discontinuous long fiber reinforced thermoplastic resin composite sheet product was produced. The thermoplastic resin composite sheet product so made was reinforced by the discontinuous fibers having a length of 5 m. The composite sheet product has a thickness of 1.0 mm or so.

TABLE 1

| Angular range deviating from the longitudinal axis | Accumulative % of oriented rectangular thin sheets |
| --- | --- |
| 0 | 13.36 |
| 0–5 | 68.17 |
| 5–10 | 91.16 |
| 10–15 | 97.25 |
| 15–20 | 99.01 |
| 20–25 | 99.80 |
| 25–30 | 100 |

A second embodiment was carried out to study the effect of the vibration frequency on the fiber orientation. As a result, the second embodiment was similar to the first embodiment of the present invention described above, except that the former was carried out with the vibration frequencies of 40, 30 and 20 Hz. The results are shown in Table 2. The fiber orientation was lowered from 91% to as the vibration frequency was amplified from 10 Hz to 40 Hz. The effect of the vibration frequency on the fiber orientation was therefore found to be insignificant.

TABLE 2

| | Accumulative % of oriented rectangular thin sheets | | | |
| --- | --- | --- | --- | --- |
| Angular range[a] | 10 Hz | 20 Hz | 30 Hz | 40 Hz |
| 0 | 13.36 | 11.68 | 11.15 | 10.29 |
| 0–5 | 68.17 | 66.39 | 59.05 | 56.59 |
| 5–10 | 91.16 | 88.93 | 85.56 | 81.69 |
| 10–15 | 97.25 | 97.13 | 95.25 | 90.13 |
| 15–20 | 99.01 | 98.36 | 98.91 | 95.89 |
| 20–25 | 99.80 | 99.18 | 99.64 | 98.36 |
| 25–30 | 100 | 99.80 | 99.64 | 98.36 |
| 30–35 | 100 | 100 | 99.82 | 99.39 |
| 35–40 | 100 | 100 | 100 | 99.60 |
| 40–45 | 100 | 100 | 100 | 100 |

[a] Angular range deviating from the longitudinal axis

A third embodiment was carried out to study the effect of the fiber length on the fiber orientation. As a result, the third embodiment of the present invention is similar to the first embodiment of the present invention described above, except that the former was carried out by using the fibers having respectively the lengths of 4, 3 and 2 cm. The results are shown in Table 3. It was found that the fiber orientation was the worst when the fiber having the length of 2 cm was used. In other words, only 58% of the rectangular thin pieces were found to be oriented within the angular range of ±10° from the longitudinal axis when the fiber having the length of 2 cm was used. The effect was therefore found to be great.

TABLE 3

| | Accumulative % of oriented rectangular thin sheets | | | |
| --- | --- | --- | --- | --- |
| Angular range[a] | 5 cm | 4 cm | 3 cm | 2 cm |
| 0 | 13.36 | 10.87 | 9.11 | 7.60 |
| 0–5 | 68.17 | 61.96 | 48.33 | 34.79 |
| 5–10 | 91.16 | 85.51 | 74.54 | 58.36 |
| 10–15 | 97.25 | 93.48 | 86.06 | 75.09 |
| 15–20 | 99.01 | 96.20 | 92.57 | 85.17 |
| 20–25 | 99.80 | 98.01 | 95.73 | 90.49 |
| 25–30 | 100 | 99.10 | 96.85 | 93.72 |
| 30–35 | 100 | 99.64 | 98.71 | 96.38 |
| 35–40 | 100 | 99.64 | 98.90 | 97.14 |

TABLE 3-continued

| | Accumulative % of oriented rectangular thin sheets | | | |
| --- | --- | --- | --- | --- |
| Angular range[a] | 5 cm | 4 cm | 3 cm | 2 cm |
| 40–45 | 100 | 100 | 99.27 | 98.09 |
| 45–50 | 100 | 100 | 99.27 | 98.47 |
| 50–55 | 100 | 100 | 99.45 | 99.23 |
| 55–60 | 100 | 100 | 99.45 | 99.62 |
| 60–65 | 100 | 100 | 99.63 | 99.62 |
| 65–70 | 100 | 100 | 99.81 | 99.81 |
| 70–75 | 100 | 100 | 99.81 | 100 |
| 75–80 | 100 | 100 | 100 | 100 |

[a] Angular range deviating from the longitudinal axis

A fourth embodiment was conducted to investigate the effect of the width of ditches of the sieve plate on the fiber orientation. The fourth embodiment of the present invention was therefore similar to the first embodiment of the present invention, except that the former was carried out by using the horizontal sieve plate 20 comprising ditches having a width of 1.5 mm instead of 2.5 mm. The results are shown in Table 4. It was found that the fiber orientation was improved when the ditches of the sieve plate 20 is decreased. In other words, the accumulative percentage of the rectangular thin pieces oriented within the angular range of ±10° from the longitudinal axis is increased from 68% to 83% when the width of the ditches of the sieve plate 20 is reduced from 2.5 mm to 1.5 mm. The effect of the width of ditches of the sieve plate 20 on the fiber orientation was found to be rather significant.

TABLE 4

| | Accumulative % of oriented rectangular thin sheets | |
| --- | --- | --- |
| Angular range[a] | 2.5 mm | 1.5 mm |
| 0 | 13.36 | 19.96 |
| 0–5 | 68.17 | 83.23 |
| 5–10 | 91.16 | 96.40 |
| 10–15 | 97.25 | 98.80 |
| 15–20 | 99.01 | 99.20 |
| 20–25 | 99.80 | 99.60 |
| 25–30 | 100 | 99.80 |
| 30–35 | 100 | 100 |

[a] Angular range deviating from the longitudinal axis

A fifth embodiment of the present invention was intended to test the tensile strengths of the final composite sheet products reinforced by the rectangular thin sheets of various lengths, such as 5 cm, 10 cm and 15 cm. The procedures of the first embodiment of the present invention were repeated except that the rectangular thin sheets of various lengths were used. The tensile strength of the final composite sheet products was measured in accordance with the method of ASTM D3039. The test results are shown in Table 5.

TABLE 5

| rectangular thin sheets of various lengths | 5 cm | 10 cm | 15 cm |
| --- | --- | --- | --- |
| Angular range[a] ±5° | 83.2% | 94.7% | 95.2% |
| ±10° | 96.4% | 99% | 100% |
| Tensile strength (MPa) | 139.6 | 236.8 | 345.5 |

[a] Angular range deviating from the longitudinal axis

A sixth embodiment of the present invention was carried out such that an AS-4/PEEK prepreg reinforced by continuous carbon fibers was used in producing the final composite sheet product, which contains 60% by volume of the carbon fibers and has a thickness of 0.125 mm. The AS-4/PEEK prepreg was made by a British corporation called I.C.I. The sixth embodiment of the present invention is basically similar to the first embodiment of the present invention, except that the fiber orientation of the former was attained by the sieve plate 20 which was provided with the ditches having a width of 1.5 mm and was caused to vibrate at the vibration frequency of 10 Hz, and further that the fiber orientation of the former involved in the use of the rectangular thin pieces having the lengths of 5 cm, 4 cm, 3 cm and 2 cm. The results of the fiber orientation are shown in Table 6. According to the data of Table 6, 83% of the fibers having a length of 5 cm were found to be oriented within the angular range of ±5° from the longitudinal axis.

Figure 2:
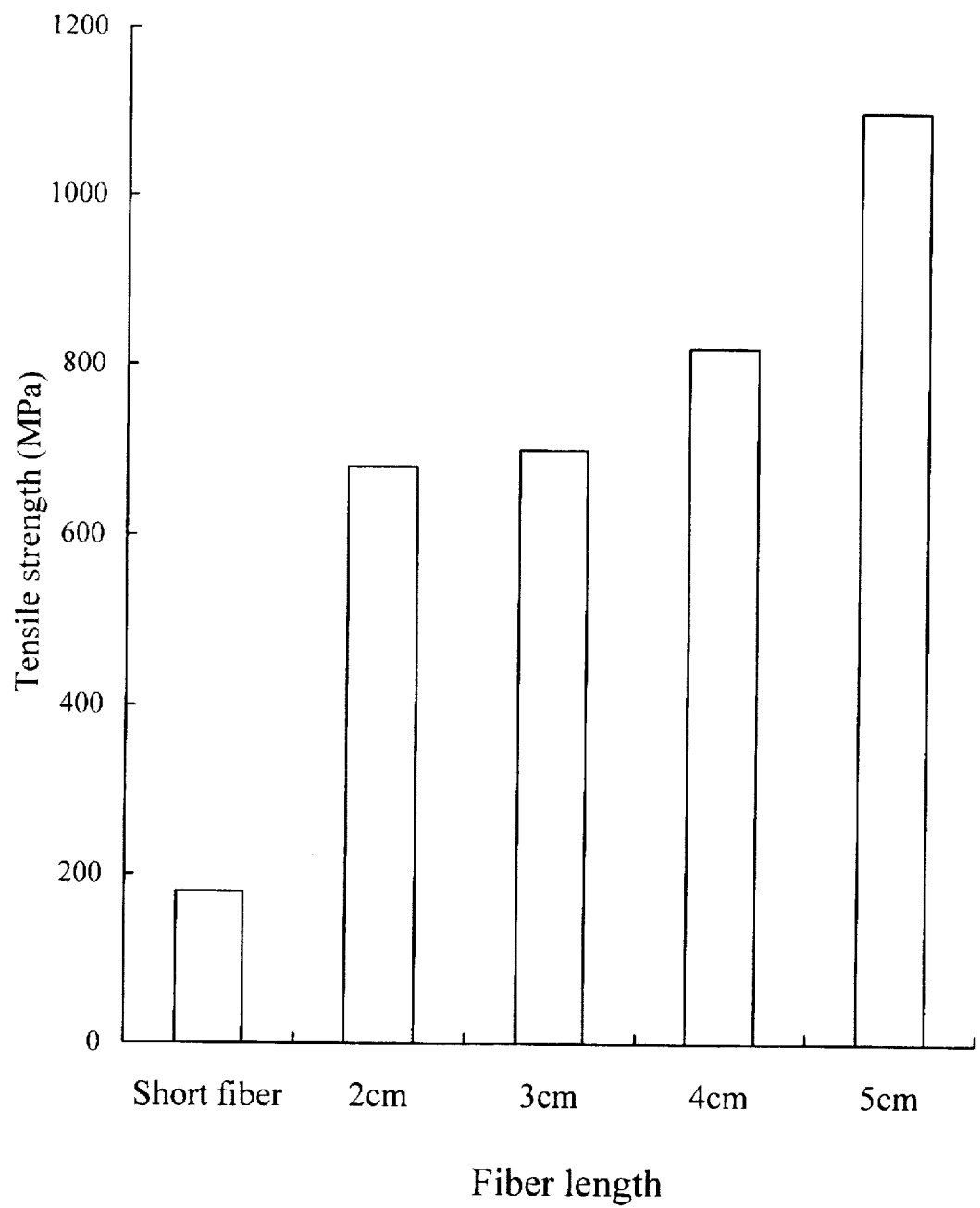
FIG. 2 shows a diagram comparing the tensile strengths of the PEEK composite material reinforced by carbon fibers of different fiber lengths.
Figure 3:
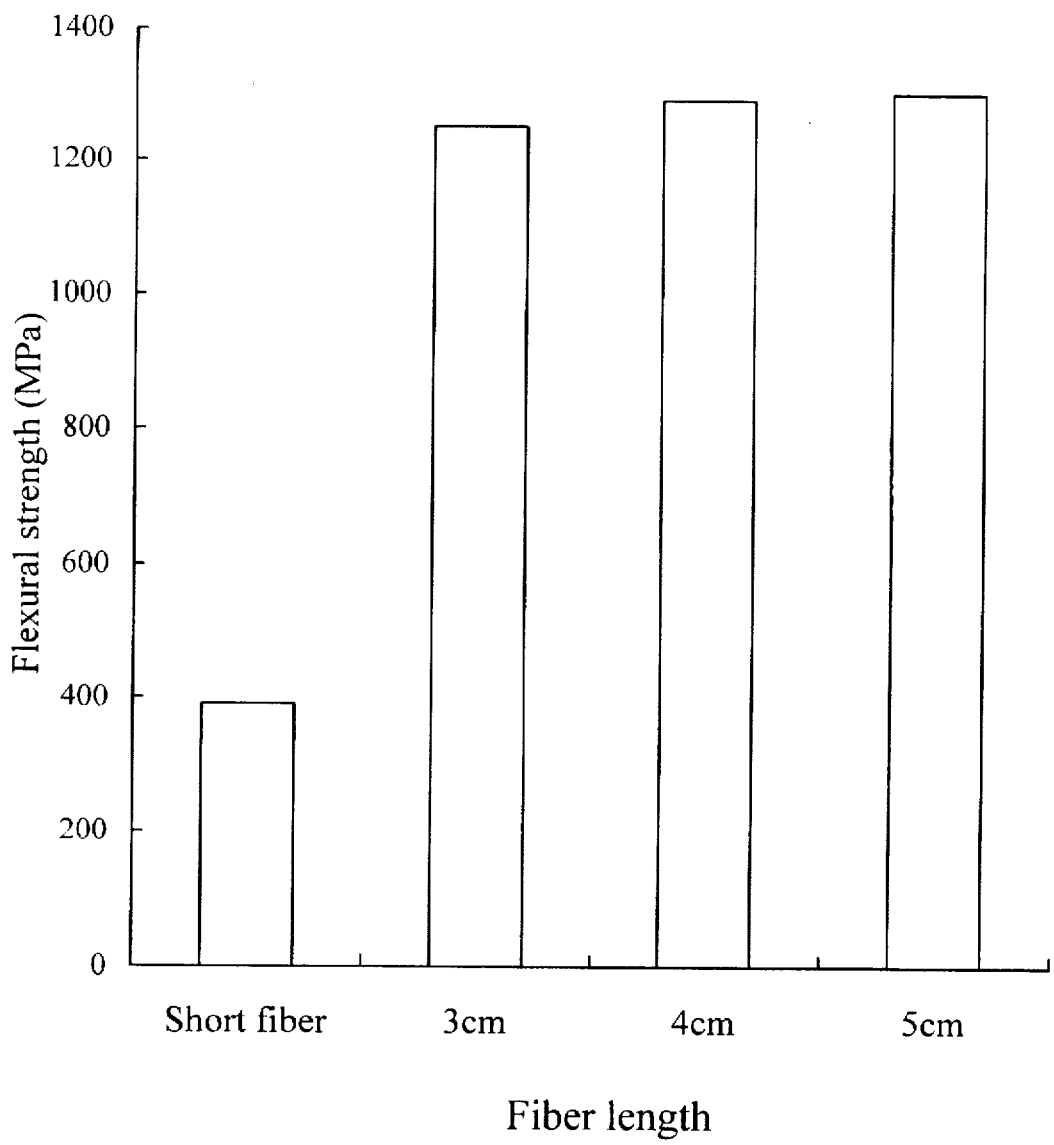
FIG. 3 shows a diagram comparing the flexural strengths of the PEEK composite material reinforced by carbon fibers of different fiber lengths.
Figure 4:
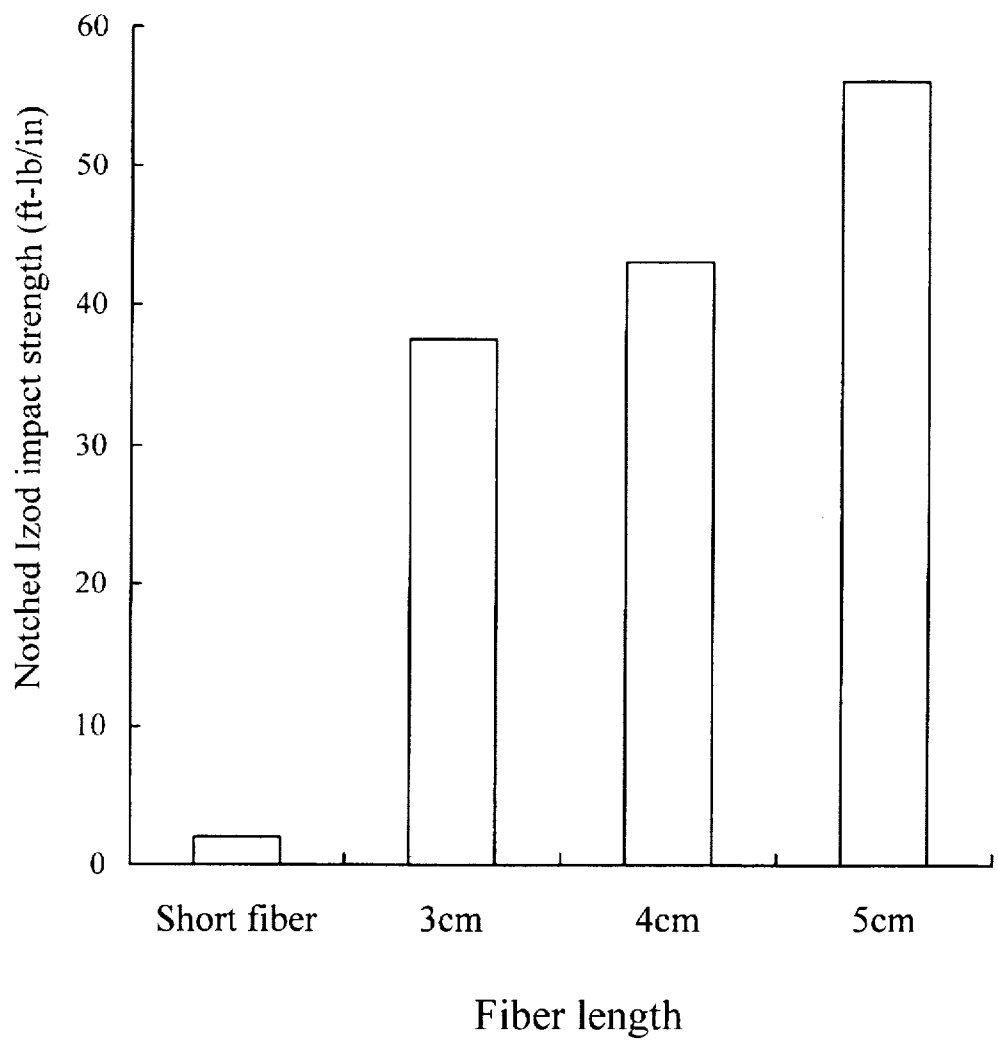
FIG. 4 shows a diagram comparing the notched Izod impact strengths of the PEEK composite material reinforced by carbon fibers of different fiber lengths.

In accordance with the method described in the first embodiment of the present invention for preparing a thermoplastic resin composite sheet product reinforced by the discontinuous long fibers, various thermoplastic resin composite sheet products were made in the sixth embodiment of the present invention. These thermoplastic resin composite sheet products were reinforced by the discontinuous fibers having lengths of 5 cm, 4 cm, 3 cm and 2 cm and were subjected to a heating and pressing process in which the pre-heating was kept at 380° C. for 20 minutes followed by pressing under a pressure of 500 psi (3.45 MPa) for 20 minutes. In accordance with the methods of ASTM D3039, D790 and D256 methods, the tensile strength, the flexural strength and the notched Izod impact strength of the sheet products were tested in comparison with the test results of the AS-4/PEEK composite sheet products containing 30% by weight of the reinforcing short carbon fibers having a length of 0.009 cm. The results are shown in FIGS. 2, 3 and 4.

TABLE 6

| | Accumulative % of oriented rectangular thin sheets | | | |
|---|---|---|---|---|
| Angular range[a] | 5 cm | 4 cm | 3 cm | 2 cm |
| 0 | 22.95 | 22.10 | 21.85 | 21.27 |
| 0–5 | 83.23 | 82.29 | 72.69 | 69.30 |
| 5–10 | 96.81 | 95.24 | 93.22 | 89.47 |
| 10–15 | 99.40 | 97.90 | 97.93 | 95.83 |
| 15–20 | 99.80 | 99.43 | 99.25 | 98.68 |
| 20–25 | 99.80 | 100 | 99.81 | 99.56 |
| 25–30 | 100 | 100 | 100 | 99.78 |
| 30–35 | 100 | 100 | 100 | 99.78 |
| 35–40 | 100 | 100 | 100 | 100 |

[a])Angular range deviating from the longitudinal axis

The embodiments of the present invention described above are to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A method for preparing an oriented discontinuous long fiber reinforced thermoplastic resin composite sheer product, said method comprising the steps of:

(a) feeding a plurality of rectangular prepreg strips of a fiber-reinforced thermoplastic resin composite to a horizontal sieve plate in vibration, said rectangular prepreg strips each having a length ranging between 1 cm and 20 cm, a width ranging between 0.01 cm and 0.2 cm, said horizontal sieve plate having a plurality of ditches parallel to one another, said ditches having a length greater than the length of said prepreg strips, and a width greater than the width and the thickness of said prepreg strips, with said width of said ditches being in a range of 1–5 mm wherein said rectangular prepreg strips have substantially the same dimensions and each is formed by cutting a prepreg sheet of a continuous fiber reinforced thermoplastic resin composite which has a thickness ranging between 0.01 cm and 0.2 cm.;

(b) disposing said prepreg strips onto a stationary mold plate or thermoplastic resin sheet product positioned under said horizontal sieve plate, said vibration causing said prepreg strips to pass through said ditches and fall evenly over a plane of said stationary mold plate or thermoplastic resin sheet product;

(c) horizontally removing, with said strips, said mold plate or said thermoplastic resin sheet product from underneath said horizontal sieve plate; and (d) heating and pressing said prepreg strips deposited on said mold plate or on said thermoplastic resin sheet product, such that an oriented discontinuous long fiber reinforced thermoplastic resin composite sheet product is formed.

2. The method as defined in claim 1, wherein said fiber-reinforced thermoplastic resin composite contains a thermoplastic resin of polypropylene, polyamides, acrylonitrile-butadiene-styrene copolymers, polycarbonate or poly(ether ketone ketone).

3. The method as defined in claim 1, wherein said fiber-reinforced thermoplastic resin composite contains glass fibers, carbon fibers, aromatic polyamide fibers, ceramic fibers, metal fibers or hybrid fibers thereof.

4. The method as defined in claim 2, wherein said continuous fiber reinforced thermoplastic resin composite contains continuous fibers in the form of strand, roving, woven roving, cloth, or mat.

5. The method as defined in claim 1, wherein said rectangular prepreg strips each have a length ranging between 1 cm and 10 cm.

6. The method as defined in claim 1, wherein said ditches of said horizontal sieve plate have a width ranging between 2.5 mm and 5.0 mm.

7. The method as defined in claim 1, wherein said horizontal sieve plate is caused to vibrate at a vibration frequency ranging between 1 and 50 Hz.

8. The method as defined in claim 7, wherein said vibration frequency ranges between 10 and 30 Hz.

9. The method as defined in claim 7, wherein said horizontal sieve plate is caused to vibrate in a direction perpendicular to a horizontal surface of said horizontal sieve plate.

10. A method for preparing an oriented and discontinuous long fiber reinforced thermoplastic resin composite sheet product, said method comprising the steps of:

(a) introducing a plurality of fibers to a horizontal sieve plate in vibration, said fibers having substantially the same dimensions and each having a length ranging between 1 cm and 20 cm, a thickness ranging between 0.01 cm and 0.2 cm, and a width ranging between 0.01 cm and 0.2 cm said horizontal sieve having a plurality of ditches parallel to one another, said ditches having a length greater than a length of said fibers, said ditches further having a width greater than a width and a thickness of said fibers, with said width of said ditches being in a range of 1–5 mm;

(b) disposing said fibers onto a stationary bottom layer thermoplastic resin sheet product positioned under said horizontal sieve plate, said vibration causing said fibers to pass through said ditches and fall evenly over a plane of said stationary bottom layer thermoplastic resin sheet product;

(c) horizontally removing said bottom layer thermoplastic resin sheet product having said fibers deposited thereon from underneath said horizontal sieve plate;

(d) joining an upper layer thermoplastic resin sheet product with said bottom layer thermoplastic resin sheet product having said fibers deposited thereon such that said upper layer thermoplastic resin sheet product and said bottom layer thermoplastic resin sheet product sandwich said fibers and form a laminated product; and (e) heating and pressing under pressure said laminated product such that a thermoplastic resin composite sheet product reinforced by oriented and discontinuous long fibers is formed.

11. The method as defined in claim 10, wherein said bottom layer thermoplastic resin sheet product and said upper layer thermoplastic resin sheet product are polypropylene, polyamides, acrylonitrile-butadiene-styrene copolymers, polycarbonate or poly(ether ketone ketone).

12. The method as defined in claim 10, wherein said fibers are glass fibers, carbon fibers, aromatic polyamide fibers, ceramic fibers, metal fibers or hybrid fibers thereof.

13. The method as defined in claim 10, wherein said ditches of said horizontal sieve plate have a width ranging between 2.5 mm and 5.0 mm.

14. The method as defined in claim 10, wherein said horizontal sieve plate is caused to vibrate at a vibration frequency ranging between 1 and 50 Hz.

15. The method as defined in claim 14, wherein said vibration frequency ranges between 10 and 30 Hz.

16. The method as defined in claim 10, wherein said horizontal sieve plate is caused to vibrate in a direction perpendicular to a horizontal surface of said horizontal sieve plate.

* * * * *

UNITED STATES PATENT AND TRADEMARK OFFICE
CERTIFICATE OF CORRECTION

PATENT NO. : 5,741,382
DATED : April 21, 1998
INVENTOR(S) : Ma, et al.

It is certified that error appears in the above-indentified patent and that said Letters Patent is hereby corrected as shown below:

Col. 1, line 50 "min." should be --mm.--;

Col. 3, line 65 "min." should be --mm.--; and

Col. 7, line 19 add --82%-- between to and as.

Signed and Sealed this

Thirtieth Day of June, 1998

Attest:

BRUCE LEHMAN

Attesting Officer     Commissioner of Patents and Trademarks